(12) United States Patent
Ide et al.

(10) Patent No.: US 11,522,495 B2
(45) Date of Patent: Dec. 6, 2022

(54) PHOTOELECTRIC CONVERSION MODULE AND PHOTOELECTRIC CONVERSION MODULE ARRAY

(71) Applicants: Takahiro Ide, Shizuoka (JP); Naomichi Kanei, Shizuoka (JP)

(72) Inventors: Takahiro Ide, Shizuoka (JP); Naomichi Kanei, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 30 days.

(21) Appl. No.: 16/885,421

(22) Filed: May 28, 2020

(65) Prior Publication Data

US 2020/0382055 A1 Dec. 3, 2020

(30) Foreign Application Priority Data

May 31, 2019 (JP) .............................. JP2019-103120
Jan. 29, 2020 (JP) .............................. JP2020-012080

(51) Int. Cl.
*H02S 40/36* (2014.01)
*H01G 9/20* (2006.01)
*H02S 40/38* (2014.01)

(52) U.S. Cl.
CPC .......... *H02S 40/36* (2014.12); *H01G 9/2068* (2013.01); *H01G 9/2081* (2013.01); *H02S 40/38* (2014.12)

(58) Field of Classification Search
CPC .......... H02S 40/36; H02S 40/38; H02S 40/34; H02S 50/10; H01G 9/2068; H01G 9/2081; Y02P 90/50; Y02E 70/30; Y02E 10/542
See application file for complete search history.

(56) References Cited

U.S. PATENT DOCUMENTS

| 2005/0279400 | A1* | 12/2005 | Banister | H02S 20/25 136/244 |
| 2012/0073623 | A1* | 3/2012 | Jones | H01L 31/048 136/245 |
| 2017/0092433 | A1 | 3/2017 | Kanei et al. | |
| 2018/0197688 | A1 | 7/2018 | Horiuchi et al. | |
| 2018/0198083 | A1 | 7/2018 | Tanaka et al. | |
| 2019/0252129 | A1 | 8/2019 | Horiuchi et al. | |
| 2020/0066458 | A1 | 2/2020 | Matsuyama et al. | |

FOREIGN PATENT DOCUMENTS

| JP | 2006-173539 | 6/2006 |
| JP | 2013-254900 | 12/2013 |
| JP | 6249093 | 12/2017 |

* cited by examiner

*Primary Examiner* — Tae-Sik Kang
(74) *Attorney, Agent, or Firm* — IPUSA, PLLC

(57) ABSTRACT

A photoelectric conversion module includes a substrate, a photoelectric conversion element mounted on the substrate, and a connector mounted on the substrate, the connector including a terminal that is electrically coupled to the photoelectric conversion element, wherein the connector is configured such that coupling the connector to a connector of another photoelectric conversion module causes the photoelectric conversion element to be electrically coupled to a photoelectric conversion element of the another photoelectric conversion module.

14 Claims, 16 Drawing Sheets

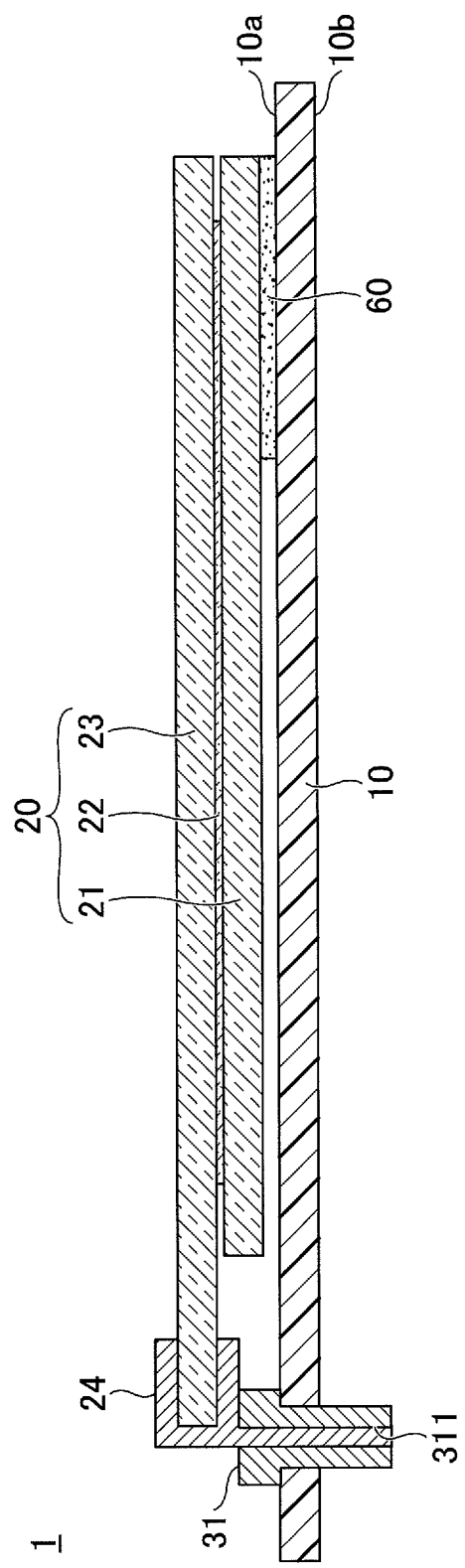

US 11,522,495 B2

PHOTOELECTRIC CONVERSION MODULE AND PHOTOELECTRIC CONVERSION MODULE ARRAY

CROSS-REFERENCE TO RELATED APPLICATION

The present application is based on and claims priority under 35 U.S.C. § 119 to Japanese Patent Application No. 2019-103120, filed on May 31, 2019, and Japanese Patent Application No. 2020-012080, filed on Jan. 29, 2020, the contents of which are incorporated herein by reference in their entirety.

BACKGROUND OF THE INVENTION

1. Field of the Invention

The present disclosure relates to a photoelectric conversion module and a photoelectric conversion module array.

2. Description of the Related Art

In recent years, the importance of photoelectric conversion modules has been increasing as alternative energy to fossil fuels or as a global warming solution. In particular, much attention has been given to photoelectric conversion elements for indoor use that can efficiently generate power even using low illumination light because wide applications as an autonomous power source, which does not require battery replacement and power source wiring for example, can be expected.

Examples of the photoelectric conversion elements include amorphous silicon solar cells, organic solar cells, perovskite solar cells, and dye-sensitized solar cells. For example, a solar panel in which multiple solar cell units each having multiple solar cells coupled in series are arranged in parallel in two dimensional directions on one substrate, is disclosed (e.g., Patent Document 1).

Patent Document 1: Japanese Unexamined Patent Application Publication No. 2006-173539

SUMMARY OF THE INVENTION

According to one aspect of an embodiment, a photoelectric conversion module includes a substrate, a photoelectric conversion element mounted on the substrate, and a connector mounted on the substrate, the connector including a terminal that is electrically coupled to the photoelectric conversion element, wherein the connector is configured such that coupling the connector to a connector of another photoelectric conversion module causes the photoelectric conversion element to be electrically coupled to a photoelectric conversion element of the another photoelectric conversion module.

BRIEF DESCRIPTION OF THE DRAWINGS

FIG. 2A is a first cross-sectional view illustrating an example of the photoelectric conversion module according to the first embodiment;

DESCRIPTION OF THE EMBODIMENTS

Figure 1:
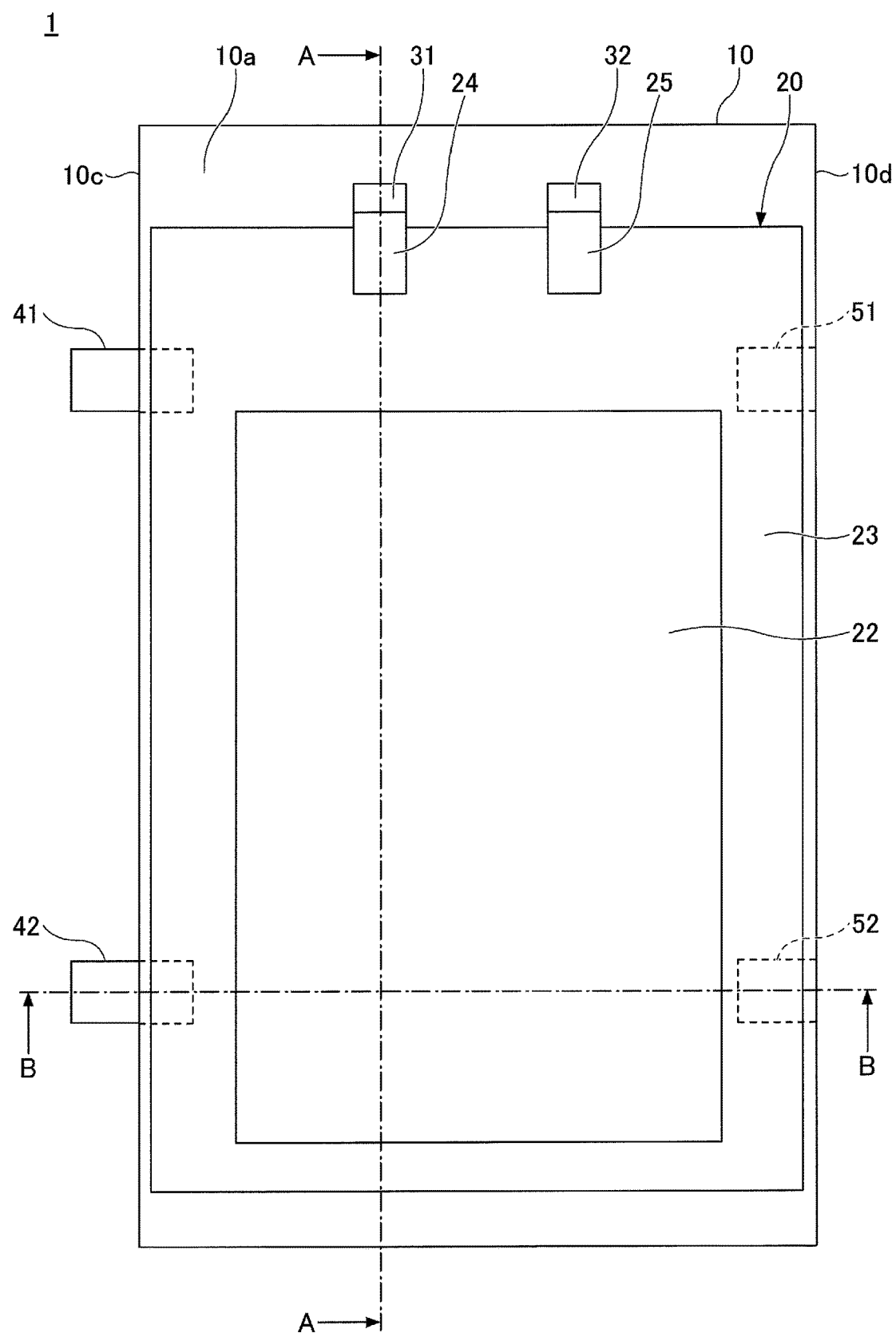
FIG. 1 is a plan view illustrating an example of a photoelectric conversion module according to a first embodiment.

When photoelectric conversion modules in which the photoelectric conversion elements are mounted, are mutually coupled, a lead wire, for example, is required for a connection between the photoelectric conversion modules, and the wiring resistance between the photoelectric conversion elements of each photoelectric conversion module is increased. As a result, a large voltage drop might occur in output of the photoelectric conversion elements.

According to an embodiment of the present invention, a voltage drop in output of the photoelectric conversion elements that occurs when multiple photoelectric conversion modules are mutually coupled, can be suppressed.

In the following, the embodiment of the present invention will be described with reference to the drawings. In the drawings, the same components are referenced by the same reference numerals and an overlapping description may be omitted.

First Embodiment

FIG. 1 is a plan view illustrating an example of a photoelectric conversion module according to a first embodiment. FIG. 2A is a first cross-sectional view illustrating an example of the photoelectric conversion module according to the first embodiment, and illustrates a cross-section taken along the line A-A of FIG. 1. FIG. 3 is a second cross-sectional view illustrating an example of the photoelectric conversion module according to the first embodiment, and illustrates a cross-section taken along the B-B line of FIG. 1.

With reference to FIGS. 1 to 3, a photoelectric conversion module 1 includes a substrate 10, a photoelectric conversion element 20, sockets 31 and 32, male connectors 41 and 42, and female connectors 51 and 52.

The substrate 10 is a substrate on which the photoelectric conversion element 20, the sockets 31 and 32, the male connectors 41 and 42, the female connectors 51 and 52, and so on, are mounted. The substrate 10 includes lands on which these components are mounted and a wiring pattern that electrically couples necessary parts of these components. The substrate 10 may be, for example, a resin substrate (such as a glass epoxy substrate), a silicon substrate, or a ceramic substrate.

In the present embodiment, the following description assumes that the planar shape of the substrate 10 is a rectangle shape, for example. However, the planar shape of the substrate 10 is not limited to a rectangular shape. Here, planar view indicates viewing an object from a normal direction of an upper surface 10a of the substrate 10, and the planar shape indicates a shape of an object that is viewed from the normal direction of the upper surface 10a of the substrate 10.

The photoelectric conversion element 20 includes a substrate 21, a power generator 22, and a substrate 23. The power generator 22 is sandwiched between the substrate 21 and the substrate 23 in an up and down direction. The periphery of the power generator 22 may be sealed by a resin, for example.

The photoelectric conversion element 20 is mounted on the upper surface 10a of the substrate 10 with a light receiving surface facing upwards (i.e., in a direction that is not facing the upper surface 10a of the substrate 10). The substrate 23 is transparent, and sunlight, for example, enters the light receiving surface of the power generator 22 through the substrate 23. The substrates 21 and 23 are, for example, glass. The photoelectric conversion element 20 includes a positive terminal 24 (i.e., a plus terminal) and a negative terminal 25 (i.e., a minus terminal).

The photoelectric conversion element 20 is an element that converts light energy to electrical energy, and is, for example, a solar cell or a photodiode. Examples of the solar cells include amorphous silicon solar cells, organic thin film solar cells, perovskite solar cells, and dye-sensitized solar cells.

Among these examples, the dye-sensitized solar cells are preferable in that the dye-sensitized solar cells are advantageous for cost reduction because the dye-sensitized solar cells can be manufactured using a conventional printing means. Particularly, solid-state dye-sensitized solar cells that use a solid material as a hole transport layer forming the dye-sensitized solar cells, are preferable in that the solid-state dye-sensitized solar cells can maintain high durability to a load.

Figure 4:
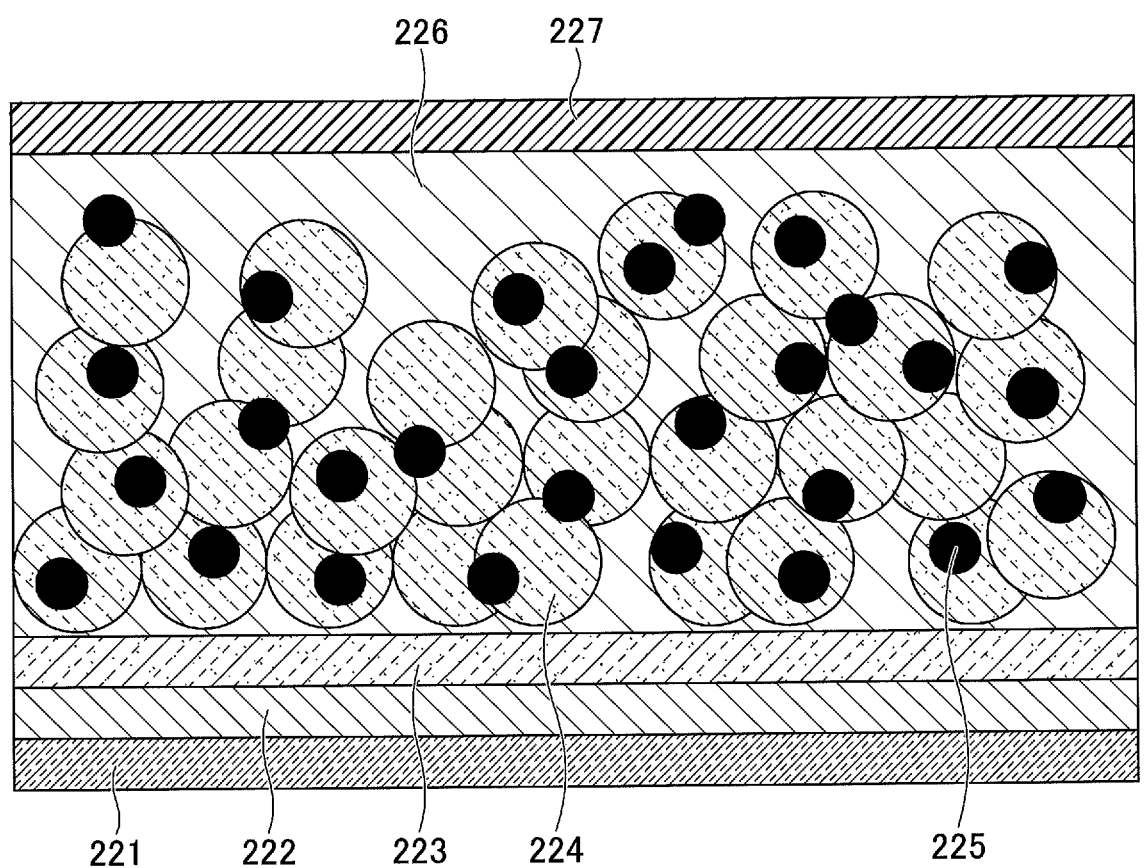
FIG. 4 is a cross-sectional view illustrating an example of a power generator of a photoelectric conversion element.

FIG. 4 is a cross-sectional view illustrating an example of the power generator of the photoelectric conversion element. When the photoelectric conversion element 20 is the dye-sensitized solar cell, the power generator 22 has, for example, a cross-sectional structure illustrated in FIG. 4.

The power generator 22 illustrated in FIG. 4, is an example of a configuration in which a first electrode 222 is formed on a substrate 221, a hole blocking layer 223 is formed on the first electrode 222, an electron transport layer 224 is formed on the hole blocking layer 223, a photosensitizing compound 225 is adsorbed on an electron transport material in the electron transport layer 224, and a hole transport layer 226 is between the first electrode 222 and a second electrode 227 facing the first electrode 222. The first electrode 222 is coupled to the positive terminal 24 through, for example, a lead wire, and the second electrode 227 is coupled to the negative terminal 25 through, for example, a lead wire. In the following, the power generator 22 will be described in detail.

[Substrate]

The substrate 221 is not particularly limited and a publicly known substrate can be used. The substrate 221 is preferably a transparent material. Examples of the substrate 221 include glass, a transparent plastic plate, a transparent plastic film, and an inorganic transparent crystal.

[First Electrode]

For the first electrode 222, there is no particular limitation as long as the first electrode 222 is a conductive material that is transparent to visible light. Any material can be appropriately selected according to a purpose, and a normal photoelectric conversion element or a publicly known material used for a liquid crystal panel or the like can be used.

Materials of the first electrode 222 include, for example, indium-tin oxide (ITO), fluorine-doped tin oxide (FTO), antimony-doped tin oxide (ATO), indium-zinc oxide, niobium-titanium oxide, and graphene. These may be used either singly or in combination of two or more materials.

The thickness of the first electrode 222 is preferably 5 nm to 100 μm and more preferably 50 nm to 10 μm.

The first electrode 222 is preferably provided on the substrate 221 made of a material that is transparent to visible light in order to maintain constant hardness. A publicly known material in which the first electrode 222 and the substrate 221 are integrated, may be used, and may be FTO coated glass, ITO coated glass, zinc oxide-doped aluminum coated glass, an FTO coated transparent plastic film, or an ITO coated transparent plastic film, for example.

[Hole Blocking Layer]

The hole blocking layer 223 is provided to suppress power reduction caused by recombination of holes in an electrolyte and electrons on an electrode surface with the electrolyte contacting the electrode surface (what is called back electron transfer). The effect of the hole blocking layer 223 is particularly remarkable in solid-state dye-sensitized solar cells. This is because solid-state dye-sensitized solar cells using, for example, an organic hole transport material, have a faster rate of recombination (i.e., back electron transfer) of holes in the hole transport material and electrons on the electrode surface compared with wet dye-sensitized solar cells using electrolyte.

The hole blocking layer 223 preferably includes a metal oxide including titanium and niobium atoms. If required, another metal atom may be included, but a metal oxide consisting of titanium and niobium atoms may be preferred. The hole blocking layer 223 is preferably transparent to visible light, and the hole blocking layer 223 is preferably dense in order to achieve a function as a hole blocking layer.

The average thickness of the hole blocking layer 223 is preferably 1,000 nm or less, and more preferably 0.5 nm to 500 nm. When the average thickness is in the range of 0.5 nm to 500 nm, the back electron transfer can be prevented without interfering with transfer of electrons to the transparent conductive film (i.e., the first electrode 222), thereby improving the efficiency of photoelectric conversion. Also, when the average thickness is less than 0.5 nm, film density is low and the back electron transfer cannot be sufficiently prevented. When the average thickness exceeds 500 nm, internal stress increases and cracks tend to occur.

[Electron Transport Layer]

The electron transport layer 224 is formed on the hole blocking layer 223, for example, as a porous layer. Preferably, the electron transport layer 224 includes an electron transport material, such as a semiconductor particle, and the photosensitizing compound 225, which will be described below, is adsorbed on the electron transport material.

For the electron transport material, there is no particular limitation, and any material can be appropriately selected according to a purpose. However, the semiconductor material, such as a rod-shaped or a tube-shaped semiconductor material, is preferred. In the following, the semiconductor particle may be described as an example, but the electron transport material is not limited to this.

The electron transport layer 224 may be a single layer or includes multiple layers. When the electron transport layer 224 includes multiple layers, dispersion liquids of the semiconductor particles with different particle sizes can be applied as multiple layers, or different types of semiconductors or coating layers having different compositions of resin and additive, can be applied as multiple layers. When the film thickness is insufficient in a single coating, coating in multiple layers is an effective means.

For a semiconductor, there is no particular limitation, and a publicly known semiconductor may be used. Specifically, a single semiconductor, such as silicon and germanium, a compound semiconductor, such as a metal chalcogenide, or a compound having a perovskite structure, etc. may be used.

The particle diameter of the semiconductor particle is not particularly limited and may be appropriately selected according to a purpose, but the average particle diameter of the primary particle is preferably from 1 nm to 100 nm, and more preferably from 5 nm to 50 nm. Additionally, it is possible to improve efficiency by scattering incident light with semiconductor particles having the larger average particle diameter being mixed or laminated. In this case, the average particle diameter of the semiconductor particle is preferably 50 nm to 500 nm.

In general, the greater the thickness of the electron transport layer 224 is, the greater the amount of carried photosensitizing compounds per a projection area is, and the higher the light capture rate is. But, the diffusion length of injected electrons also becomes greater, and a loss of electrons caused by recombination increases. Thus, the thickness of the electron transport layer 224 is preferably from 100 nm to 100 µm, more preferably from 100 nm to 50 µm, and even more preferably from 100 nm to 10 µm.

[Photosensitizing Compounds]

In order to further improve conversion efficiency, the electron transport layer 224 preferably includes an electron transport material on which the photosensitizing compound 225 is adsorbed. A specific example of the photosensitizing compound 225 is described in detail, for example, in Japanese Patent No. 6249093.

As a method of adsorbing the photosensitizing compound 225 to the electron transport layer 224 (i.e., the electron transport material), a method of immersing an electron collecting electrode including the electron transport layer 224 (i.e., an electrode in which the substrate 221, the first electrode 222, and the hole blocking layer 223 are formed) in solution or dispersion of the photosensitizing compound 225, is used. Alternatively, a method of applying solution or dispersion to the electron transport layer 224 to be adsorbed, may be used.

In the former case, an immersion method, a dipping method, a roller method, an air knife method, or the like may be used. In the latter case, a wire bar method, a slide hopper method, an extrusion method, a curtain method, a spin method, a spray method, or the like may be used.

Additionally, the photosensitizing compound 225 may be adsorbed in supercritical fluid using, for example, carbon dioxide.

A condensation agent may also be used in adsorbing the photosensitizing compound 225. The condensation agent may cause either a catalytic action that is considered to physically or chemically combine the photosensitizing compound 225 and the electron transport material on the inorganic surface, or a stoichiometric action to favorably shift a chemical equilibrium.

[Hole Transport Layer]

For the hole transport layer 226, an electrolyte in which a redox pair is dissolved in an organic solvent, a gel electrolyte in which a liquid in which a redox pair is dissolved in an organic solvent is impregnated in a polymer matrix, a molten salt including a redox pair, a solid electrolyte, an inorganic hole transport material, an organic hole transport material, or the like may be used. Among these, the organic hole transport material is preferred. Here, in the following, the organic hole transport material may be described as an example, but the hole transport layer 226 is not limited this.

The hole transport layer 226 may be a single layer structure of a single material or a laminate structure of multiple compounds. When the hole transport layer 226 is a laminate structure, it is preferable to use a polymer material for the hole transport layer 226 near the second electrode 227. The surface of the porous electron transport layer 224 can be smoothed by using a polymer material with good film forming performance, and thereby improving a photoelectric conversion characteristic.

Since the polymer material is difficult to permeate into the porous electron transport layer 224, the polymer material is superior in coating the surface of the porous electron transport layer 224, and the polymer material exhibits an effect in preventing a short circuit when the electrode is provided. This can obtain higher performance.

For a single organic hole transport material used in a single layer structure, there is no particular limitation, and a publicly known organic hole transport compound may be used.

The thickness of the hole transport layer 226 is not particularly limited and may be selected according to a purpose. But, preferably, the hole transport layer 226 is configured to enter pores of the porous electron transport layer 224, and the thickness of the hole transport layer 226 is 0.01 µm or greater, and more preferably 0.1 µm to 10 µm, on the electron transport layer 224.

[Second Electrode]

The second electrode 227 can be formed on the hole transport layer 226 or on a metal oxide in the hole transport layer 226. For the second electrode 227, an electrode similar to the first electrode 222 may be used, and a support is not necessarily required in a configuration in which the strength and sealing performance are maintained sufficiently.

Examples of the material of the second electrode 227 include metals, such as platinum, gold, silver, copper, and aluminum, carbon-based compounds, such as graphite, fullerene, carbon nanotubes, and graphene, conductive metal oxides, such as ITO, FTO, and ATO, and conductive polymers, such as polythiophene and polyaniline.

The thickness of the second electrode 227 is not particularly limited and may be appropriately selected according to a purpose. Depending on the type of a used material and the type of the hole transport layer 226, the second electrode 227 may be appropriately formed by a method such as applying, laminating, depositing, CVD, sticking, or the like, on the hole transport layer 226.

At least one of the first electrode 222 and the second electrode 227 must be substantially transparent for the photoelectric conversion of the power generator 22. In the example of FIG. 4, since the first electrode 222 is transparent, sunlight, for example, enters from the first electrode 222 side.

That is, in the photoelectric conversion module 1, the power generator 22 is disposed between the substrate 21 and the substrate 23 such that the first electrode 222 is positioned at the substrate 23 side. In this case, it is preferable to use a material that reflects light for the second electrode 227 side, and for example, a metal, glass on which a conductive oxide is deposited, a plastic, or a thin metal film, may be used. It is also an effective means to provide an anti-reflection layer on an incident light side.

The photoelectric conversion element 20 having the power generator 22 can obtain good conversion efficiency even in the case of weak incident light such as indoor light.

Returning to the description of FIGS. 1 to 3, the sockets 31 and 32 that can be coupled to the positive terminal 24 and the negative terminal 25 of the photoelectric conversion element 20 respectively, are mounted on the substrate 10. The photoelectric conversion element 20 is mounted through the sockets 31 and 32 to the substrate 10 in a removable state.

Specifically, the sockets 31 and 32 are mounted at a predetermined interval on the upper surface 10a of the substrate 10, substantially parallel to the shorter side direction of the substrate 10 in planar view. The socket 31 includes an insertion hole 311 through which the positive terminal 24 of the photoelectric conversion element 20 is inserted, and the socket 31, for example, is inserted into a through hole provided in the substrate 10. The socket 32 includes an insertion hole through which the negative terminal 25 of the photoelectric conversion element 20 is inserted, and the socket 32, for example, is inserted into a through hole provided in the substrate 10.

The positive terminal 24 of the photoelectric conversion element 20 is inserted into the insertion hole 311 of the socket 31, the negative terminal 25 of the photoelectric conversion element 20 is inserted into the insertion hole of the socket 32, and the photoelectric conversion element 20 is electrically and mechanically coupled to the sockets 31 and 32.

Figure 2B:
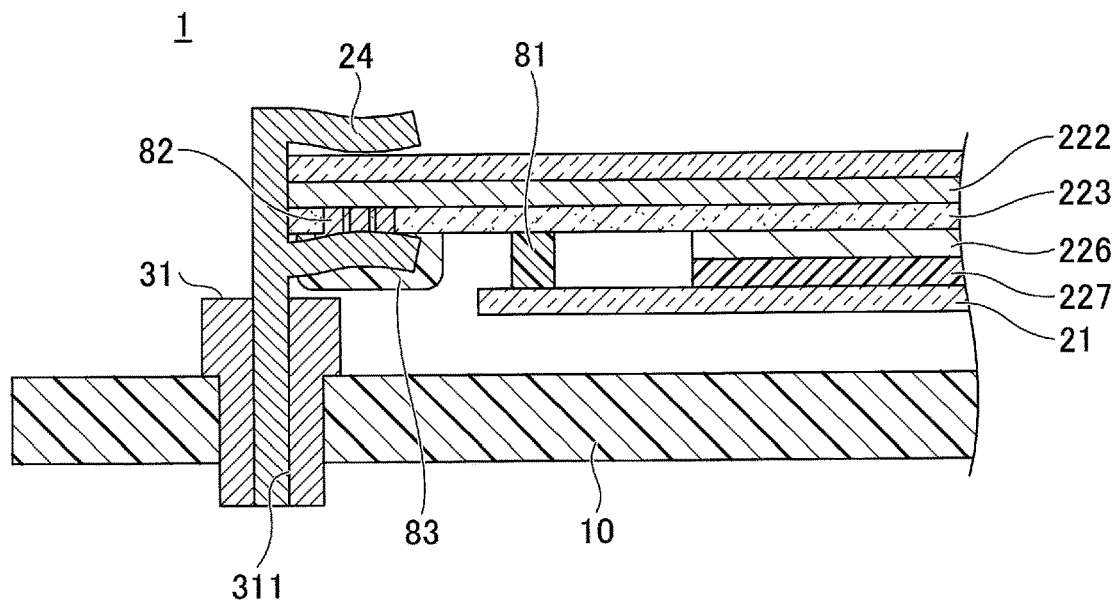
FIG. 2B is an example of an enlarged view of a part near a positive terminal in FIG. 2A.
Figure 3:
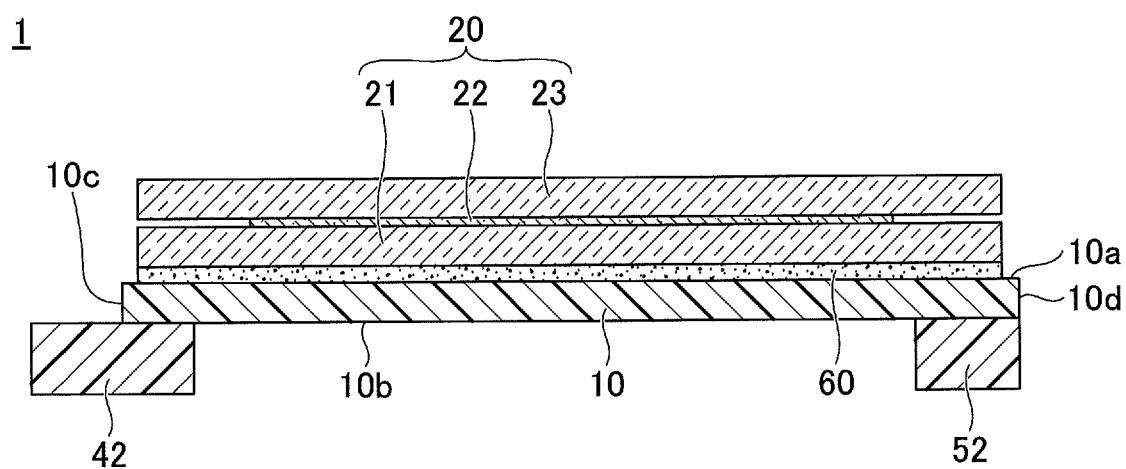
FIG. 3 is a second cross-sectional view illustrating an example of the photoelectric conversion module according to the first embodiment.

FIG. 2B is an example of an enlarged view of a part near the positive terminal 24 in FIG. 2A. As illustrated in FIG. 2B, a seal member 81 is provided between the substrate 23 and the substrate 21 in FIG. 4, so that at least the electron transport layer 224 and the hole transport layer 226 are sealed. At the positive terminal 24 side, a through hole opened in the hole blocking layer 223 is filled with a conductive part 82. A resin 83 is applied to cover a junction region in which the conductive part 82 and the positive terminal 24 join.

Figure 2C:
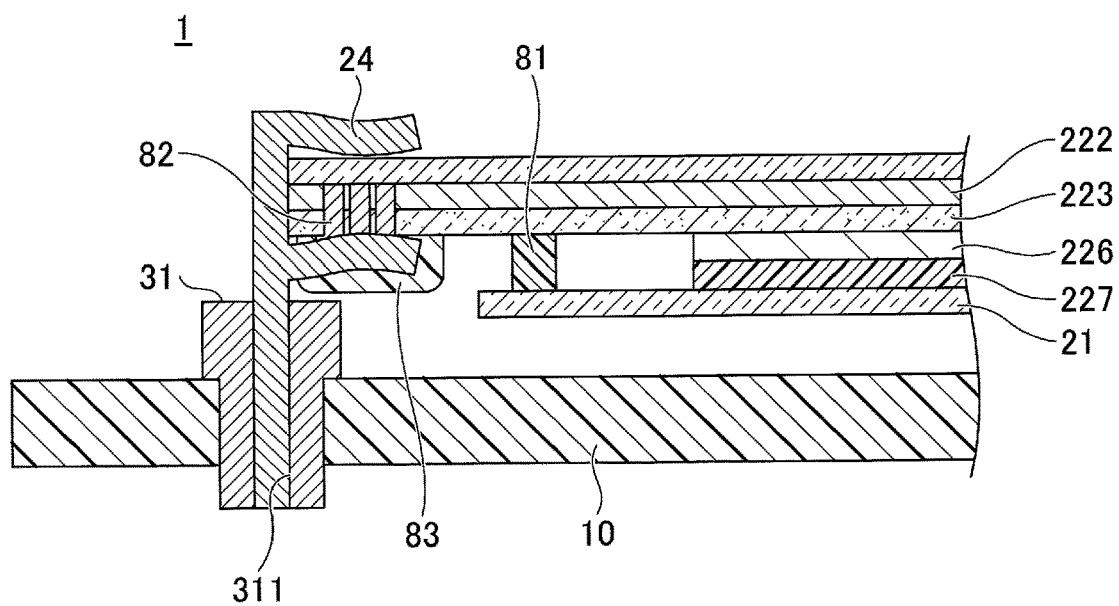
FIG. 2C is another example 1 of an enlarged view of a part near the positive terminal in FIG. 2A.
Figure 2D:
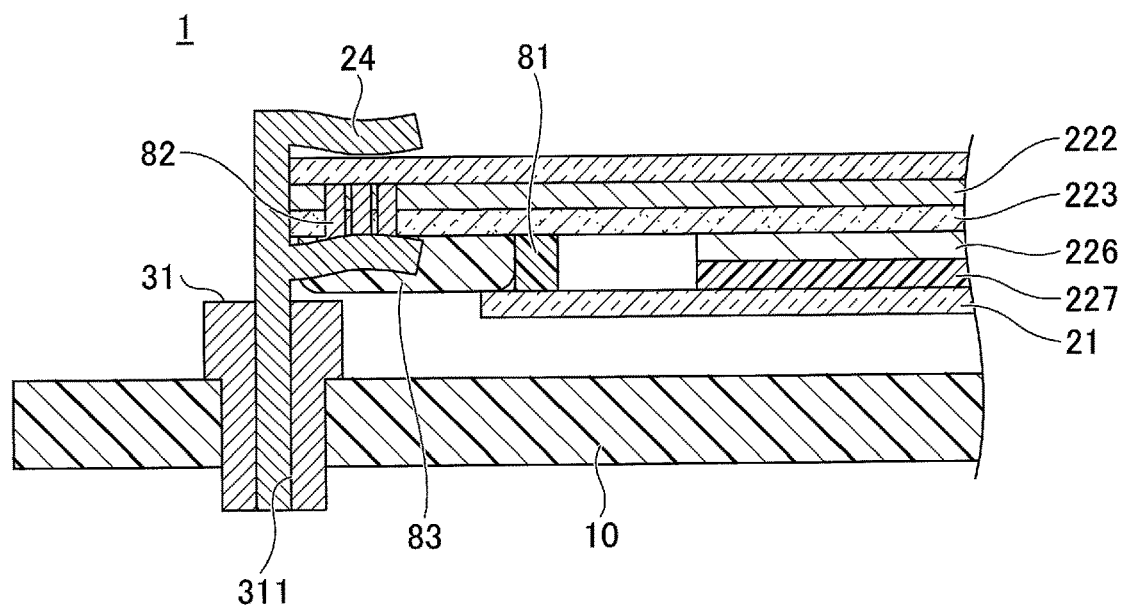
FIG. 2D is another example 2 of an enlarged view of a part near the positive terminal in FIG. 2A.
Figure 2E:
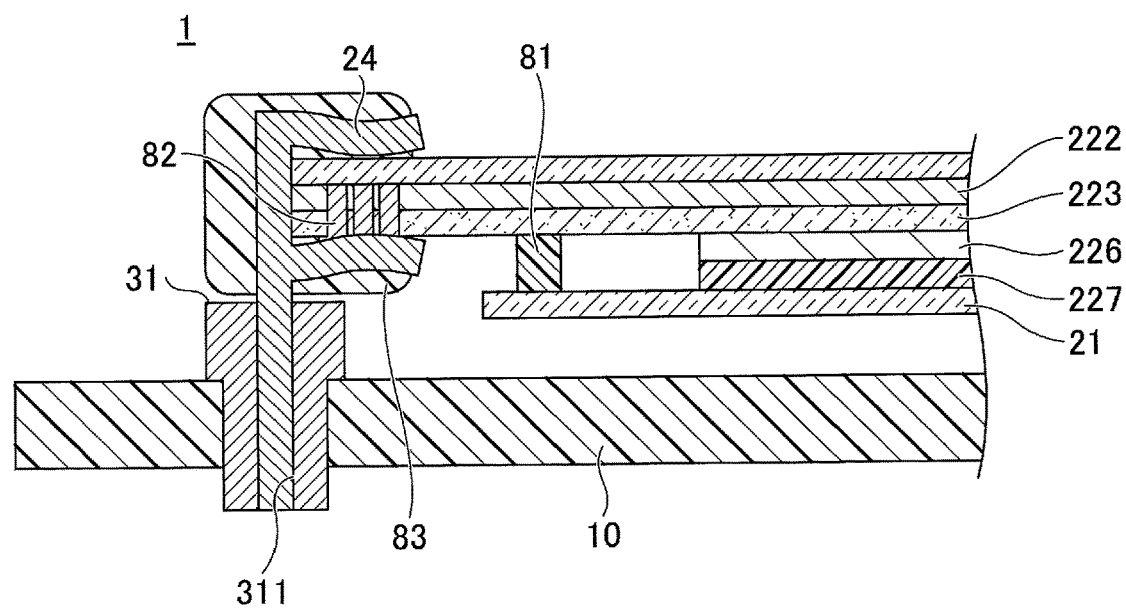
FIG. 2E is another example 3 of an enlarged view of a part near the positive terminal in FIG. 2A.

FIG. 2C is another example 1 of an enlarged view of a part near the positive terminal 24 in FIG. 2A. FIG. 2D is another example 2 of an enlarged view of a part near the positive terminal 24 in FIG. 2A. FIG. 2E is another example 3 of an enlarged view of a part near the positive terminal 24 in FIG. 2A.

As illustrated in FIGS. 2C to 2E, the seal member 81 is provided to shield at least the electron transport layer 224 and the hole transport layer 226 from an external environment. The seal member 81 is not particularly limited as long as the seal member 81 inhibits inflow of water vapor of the outside air, and can be appropriately selected according to a purpose. Examples of the seal member 81 include low melting point frit glass, an ultraviolet curing resin such as epoxy or acrylic, and a thermosetting resin. These may be used either singly or in combination of two or more materials. In addition to the constituent materials described above, a desiccant may also be mixed to further inhibit inflow of water vapor.

The conductive part 82 is provided to electrically couple the positive terminal 24 to the first electrode 222, and electrically couple the negative terminal 25 to the first electrode 222. Although it is not necessary to provide the conductive part 82, it is advantageous to provide the conductive part 82 because electric resistance can be suppressed by increasing a contact area between the positive terminal 24 (actually the conductive part 82) and the first electrode 222 and a contact area between the negative terminal 25 (actually the conductive part 82) and the first electrode 222.

The through hole opened in the hole blocking layer 223 is filled with the conductive part 82. The through hole may be provided not only in the hole blocking layer 223 but also in the first electrode 222. In this case, a through hole opened in the first electrode 222 and the hole blocking layer 223 is filled with the conductive part 82.

The conductive part 82 may be a conductive material that can fill the through hole. Examples of a material of the conductive part 82 include a paste made mainly of a metal, such as copper or silver, or a paste made mainly of carbon, but the material is not limited to this. In particular, a carbon paste is advantageous because a carbon paste has a strong resistance to moisture and oxidation.

The resin 83 is provided to fix the conductive part 82 to the positive terminal 24, and fix the conductive part 82 to the negative terminal 25. A material of the resin 83 is not particularly limited as long as a material is for fixing, and can be appropriately selected according to a purpose. Examples of the material include low melting point frit glass, an ultraviolet curing resin, such as epoxy or acrylic, and a thermosetting resin. These may be used either singly or in combination of two or more materials. The resin 83 is provided to cover at least the conductive part 82, the positive terminal 24, and the negative terminal 25.

When the positive terminal 24 is soldered, the temperature is increased by the soldering temperature being transmitted to the junction region in which the conductive part 82 and the positive terminal 24 join. The length of the positive terminal 24 is adjusted so that the temperature is equal to or lower than the temperature at which the resin 83 does not melt (for example, when a material of the resin 83 is an epoxy-based resin, the temperature is equal to or lower than 200 degrees, and more preferably, the temperature is equal to or lower than 100 degrees).

For example, when the length of the positive terminal 24 is equal to or longer than 8 mm, the junction region is maintained at a temperature equal to or lower than 100 degrees, so that the resin 83 does not melt, and the junction between the positive terminal 24 and the conductive part 82 is stable. When the length of the positive terminal 24 is shortened and the positive terminal 24 is soldered, the temperature of the resin 83 is required to be adjusted so as to be equal to or lower than the temperature at which the resin 83 does not melt. The means is not particularly limited, but may include, for example, using a terminal having a low thermal conductivity for the positive terminal 24, providing a heat radiating unit on an outer peripheral portion of the positive terminal 24, and using a low melting point solder material. These may be used either singly or in combination of two or more means.

The substrate 21 is fixed to the upper surface 10a of the substrate 10 through an adhesive layer 60 on a side opposite to the side at which the positive terminal 24 and the negative terminal 25 of the photoelectric conversion element 20 are provided. Examples of the adhesive layer 60 include a resin-based adhesive and double-sided tape. It is preferable to set the adhesion of the adhesive layer 60 in consideration of the maintenance, such as replacement of the photoelectric conversion element 20.

As described above, by mounting the photoelectric conversion element 20 to the substrate 10 in a removable state, the photoelectric conversion element 20 can be easily replaced when a failure of the photoelectric conversion element 20, such as deterioration or damage, occurs.

However, the above description is an example of a method of mounting the photoelectric conversion element 20. If necessary, the positive terminal 24 and the negative terminal 25 of the photoelectric conversion element 20 may be coupled to the land of the substrate 10 by soldering or the like without using the sockets 31 and 32. Alternatively, one socket with two insertion holes may be used instead of the sockets 31 and 32.

The substrate 21 may be substituted for the substrate 10. In this case, the sockets 31 and 32 are not required. When the substrate 21 is glass, a semiconductor integrated circuit 72 and a power storage element 71, which will be described later, can be mounted by forming a wiring pattern on a glass surface opposite to the power generator 22, for example. Further, glass processing of the substrate 21 can form a female connector and a male connector. This can eliminate the installation of the sockets 31 and 32, and can achieve downsizing of the photoelectric conversion module 1.

The male connectors 41 and 42 are mounted at a predetermined interval on a lower surface 10b of the substrate 10 at a side surface 10c side in a direction approximately parallel to the longitudinal direction of the substrate 10 in planar view. The male connectors 41 and 42 include, for example, a male terminal electrically coupled to the photoelectric conversion element 20 through a wiring pattern and a male housing holding the male terminal, and are mounted on the lower surface 10b of the substrate 10 with sides, which are to be inserted into the female connectors, facing the outside of the substrate 10 (i.e., the left side in FIG. 1).

The male connectors 41 and 42 are electrically and mechanically coupled to the land provided on the lower surface 10b of the substrate 10, for example, by solder. In planar view, portions of the male connectors 41 and 42 protrude outward from the side surface 10c of the substrate 10, and the protruding portions can be inserted into the female connectors 51 and 52 of another photoelectric conversion module 1.

The female connectors 51 and 52 are mounted at a predetermined interval on the lower surface 10b of the substrate 10 at a side surface 10d side in a direction approximately parallel to the longitudinal direction of the substrate 10 in planar view. The female connectors 51 and 52 include, for example, a female terminal electrically coupled to the photoelectric conversion element 20 through a wiring pattern and a female housing holding the female terminal, and are mounted on the lower surface 10b of the substrate 10 with sides, into which the male connectors are inserted, facing the outside of the substrate 10 (i.e. the right side in FIG. 1).

The female connectors 51 and 52 are electrically and mechanically coupled to the land provided on the lower surface 10b of the substrate 10, for example, by solder. In planar view, the female connectors 51 and 52 do not protrude outward from the side surface 10d of the substrate 10, but may protrude outward from the side surface 10d so as not to interfere with connections with the male connectors 41 and 42 of another photoelectric conversion module 1. Alternatively, the female connectors 51 and 52 may enter inside the substrate 10 from the side surface 10d so as not to interfere with connections with the male connectors 41 and 42 of another photoelectric conversion module 1.

Thus, the male connector 41 is shaped to be insertable into the female connector 51, and when the male connector 41 is inserted into the female connector 51, the male terminal of the male connector 41 contacts the female terminal of the female connector 51, and both are electrically coupled.

Similarly, the male connector 42 is shaped to be insertable into a female connector 52, and when the male connector 42 is inserted into the female connector 52, the male terminal of the male connector 42 contacts the female terminal of the female connector 52, and both are electrically coupled.

The pitch of the male connector 41 and the male connector 42 is equal to the pitch of the female connector 51 and the female connector 52.

However, as long as the male connector 41 can be inserted into the female connector 51 and the male connector 42 can be inserted into the female connector 52, the shapes, sizes, and the like of the male connectors 41 and 42 may or may not be the same, and the shapes, sizes, and the like of the female connectors 51 and 52 may or may not be the same.

The male connectors 41 and 42 and the female connectors 51 and 52 are related as described above. Thus, the male connectors 41 and 42 of the photoelectric conversion module 1 can be electrically and mechanically coupled with the female connectors 51 and 52 of another photoelectric conversion module 1 disposed at one side of the photoelectric conversion module 1. The female connectors 51 and 52 of the photoelectric conversion module 1 can be electrically and mechanically coupled with the male connectors 41 and 42 of another photoelectric conversion module 1 disposed on the other side of the photoelectric conversion module 1. An example is illustrated in FIG. 5.

Figure 5:
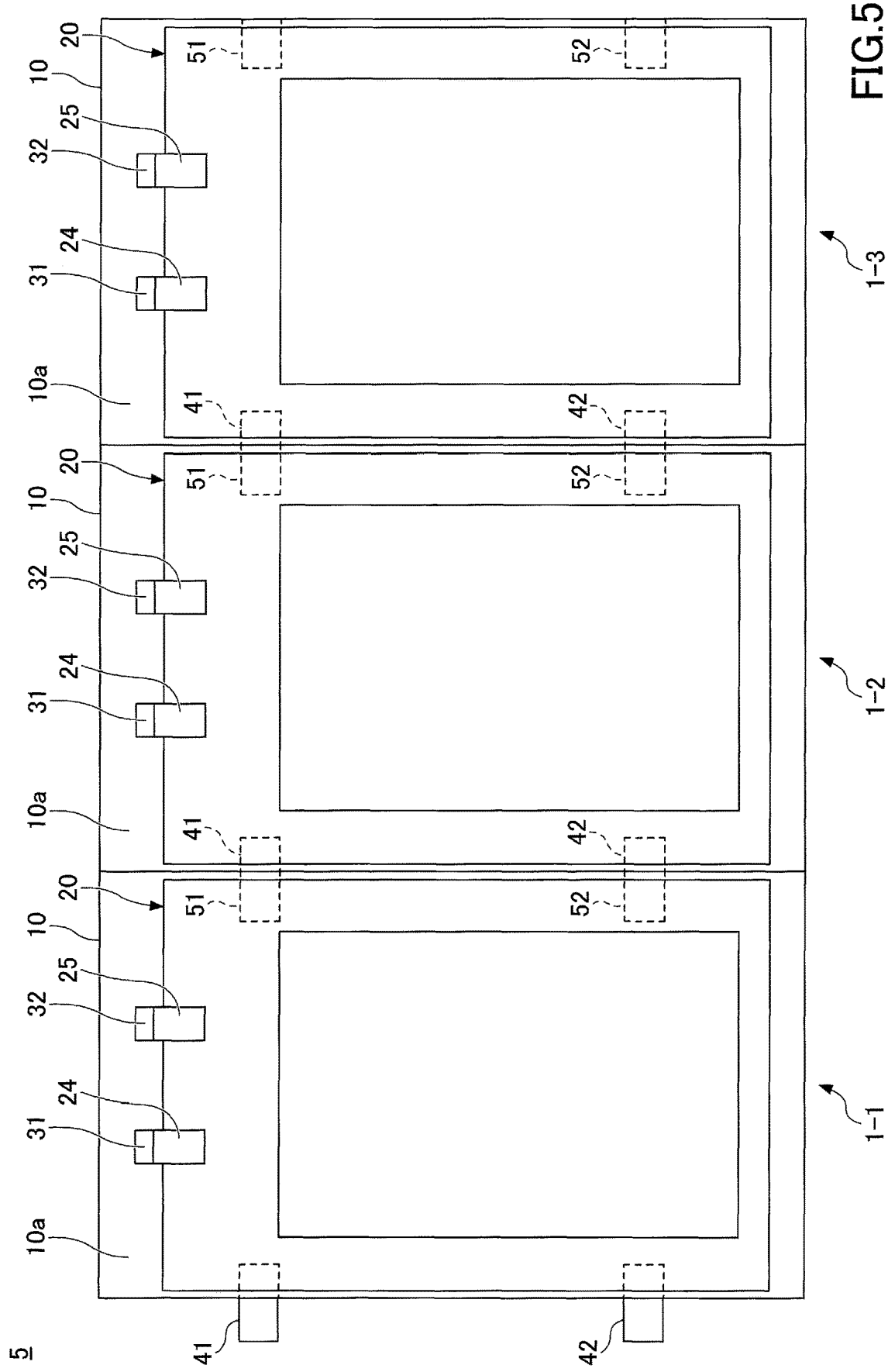
FIG. 5 is a first plan view illustrating an example of connections of multiple photoelectric conversion modules.

FIG. 5 is a first plan view illustrating an example of connections of multiple photoelectric conversion modules. As illustrated in FIG. 5, the photoelectric conversion module array 5 includes three photoelectric conversion modules 1 that are coupled with each other through the male connectors 41 and 42 and the female connectors 51 and 52. That is, the photoelectric conversion module array 5 includes three photoelectric conversion elements 20 in total. In FIG. 5, for convenience, three photoelectric conversion modules 1 are referred to as photoelectric conversion modules 1-1, 1-2, and 1-3.

In the photoelectric conversion module array 5, a male connector 41 of the photoelectric conversion module 1-2 is inserted into a female connector 51 of the photoelectric conversion module 1-1. A male terminal of the male connector 41 contacts a female terminal of the female connector 51, and both are electrically coupled. A male connector 42 of the photoelectric conversion module 1-2 is inserted into the female connector 52 of the photoelectric conversion module 1-1. A male terminal of the male connector 42 contacts a female terminal of the female connector 52, and both are electrically coupled.

Similarly, a male connector 41 of the photoelectric conversion module 1-3 is inserted into a female connector 51 of the photoelectric conversion module 1-2. A male terminal of the male connector 41 contacts a female terminal of the female connector 51, and both are electrically coupled. A male connector 42 of the photoelectric conversion module 1-3 is inserted into a female connector 52 of the photoelectric conversion module 1-2, and a male terminal of the male connector 42 contacts a female terminal of the female connector 52, and both are electrically coupled.

When multiple photoelectric conversion modules 1 are coupled with each other as in the photoelectric conversion module array 5, the photoelectric conversion elements 20 mounted on the photoelectric conversion modules are electrically coupled. The photoelectric conversion module array 5 can increase a light receiving area of the photoelectric conversion elements 20.

Figure 6:
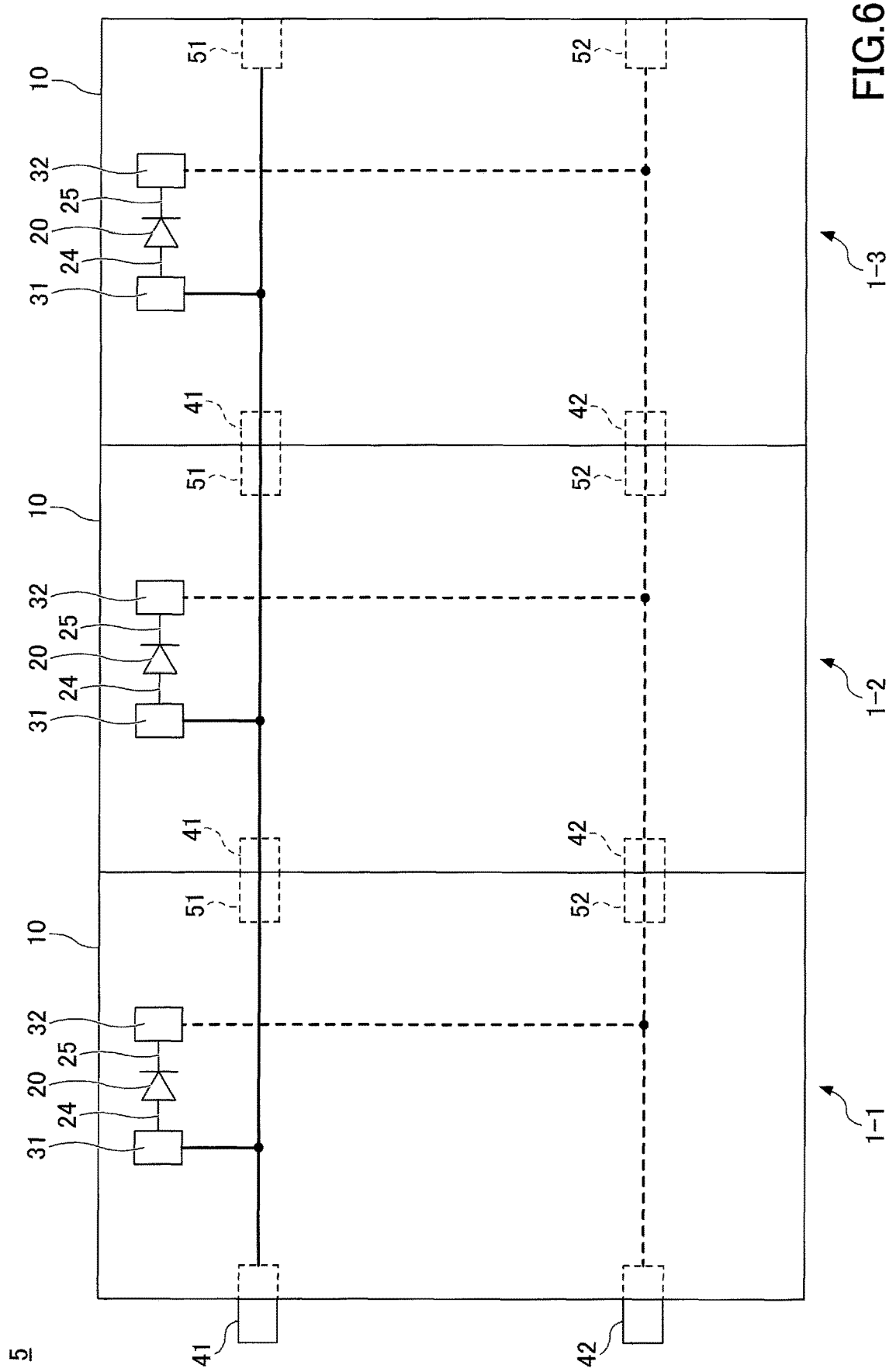
FIG. 6 is a first schematic diagram illustrating an example of interconnects on a substrate of the photoelectric conversion module according to the first embodiment.

FIG. 6 is a first schematic diagram illustrating an example of interconnects on the substrate of the photoelectric conversion module according to the first embodiment.

In the example of FIG. 6, in each of the photoelectric conversion modules 1-1, 1-2, and 1-3, the socket 31, the male connector 41, and the female connector 51 are electrically coupled, as illustrated by a solid line. The socket 32, the male connector 42, and the female connector 52 are electrically coupled, as illustrated by a dashed line.

Thus, in the photoelectric conversion elements 20 mounted in the photoelectric conversion modules 1-1, 1-2, and 1-3, the positive terminals 24 are electrically coupled, and the negative terminals 25 are electrically coupled. That is, in the example of FIG. 6, the photoelectric conversion elements 20 of the photoelectric conversion modules 1-1, 1-2, and 1-3 are coupled in parallel. In FIG. 6, for convenience, the photoelectric conversion element 20 is represented by a circuit symbol of a diode, but this does not accurately represent a circuit equivalent to the photoelectric conversion element 20 (the same applies to the subsequent figures).

Figure 7:
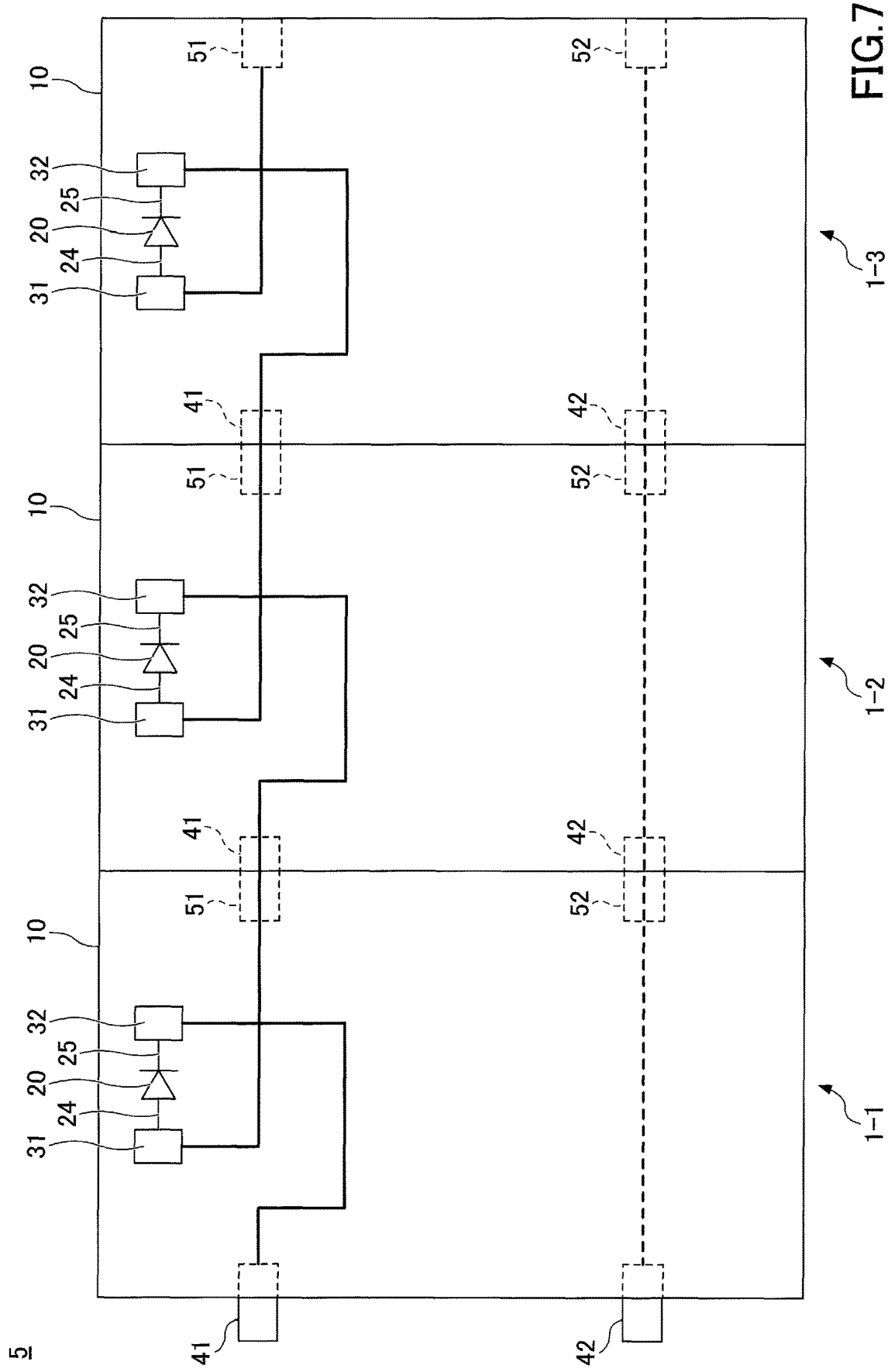
FIG. 7 is a second schematic diagram illustrating an example of interconnects on the substrate of the photoelectric conversion module according to the first embodiment.

FIG. 7 is a second schematic diagram illustrating an example of interconnects on the substrate of the photoelectric conversion module according to the first embodiment.

In the example of FIG. 7, in each of the photoelectric conversion modules 1-1, 1-2, and 1-3, the socket 31 and the female connector 51 are electrically coupled, and the socket 32 and the male connector 41 are electrically coupled, as illustrated by a solid line. The male connector 42 and the female connector 52 are electrically coupled, as illustrated by a dashed line.

Therefore, the negative terminal 25 of the photoelectric conversion element 20 mounted in the photoelectric conversion module 1-3 and the positive terminal 24 of the photoelectric conversion element 20 mounted in the photoelectric conversion module 1-2 are electrically coupled. The negative terminal 25 of the photoelectric conversion element 20 mounted in the photoelectric conversion module 1-2 and the positive terminal 24 of the photoelectric conversion element 20 mounted in the photoelectric conversion module 1-1 are electrically coupled. That is, in the example of FIG. 7, the photoelectric conversion elements 20 of the photoelectric conversion modules 1-1, 1-2, and 1-3 are coupled in series.

As described, the photoelectric conversion module 1 can be mutually coupled with another photoelectric conversion module 1 through a connector, and when the photoelectric conversion modules 1 are coupled with each other, the photoelectric conversion elements 20 mounted in the photoelectric conversion modules 1 are electrically coupled.

That is, it is not necessary to couple the photoelectric conversion modules with a lead wire or the like as in the related art, and the photoelectric conversion modules 1 can be coupled with each other through a connector with the shortest distance. Therefore, it is possible to reduce the wiring resistance between the photoelectric conversion elements 20, and to suppress the voltage drop of the output of the photoelectric conversion elements 20.

In the conventional method of connecting the photoelectric conversion modules with a lead wire or the like, it is difficult to accommodate the increase or decrease in the number of the photoelectric conversion modules to be coupled. With respect to the above, since the photoelectric conversion module 1 can be mutually coupled with another photoelectric conversion module 1 through a connector, it is easy to accommodate an increase or decrease in the number of photoelectric conversion modules 1, which is caused by a specification change of the solar power generation system, for example.

Second Embodiment

In a second embodiment, an example of a photoelectric conversion module including a power storage function will be described. In the second embodiment, a description of the same component as the component of the embodiment previously described may be omitted.

Figure 8:
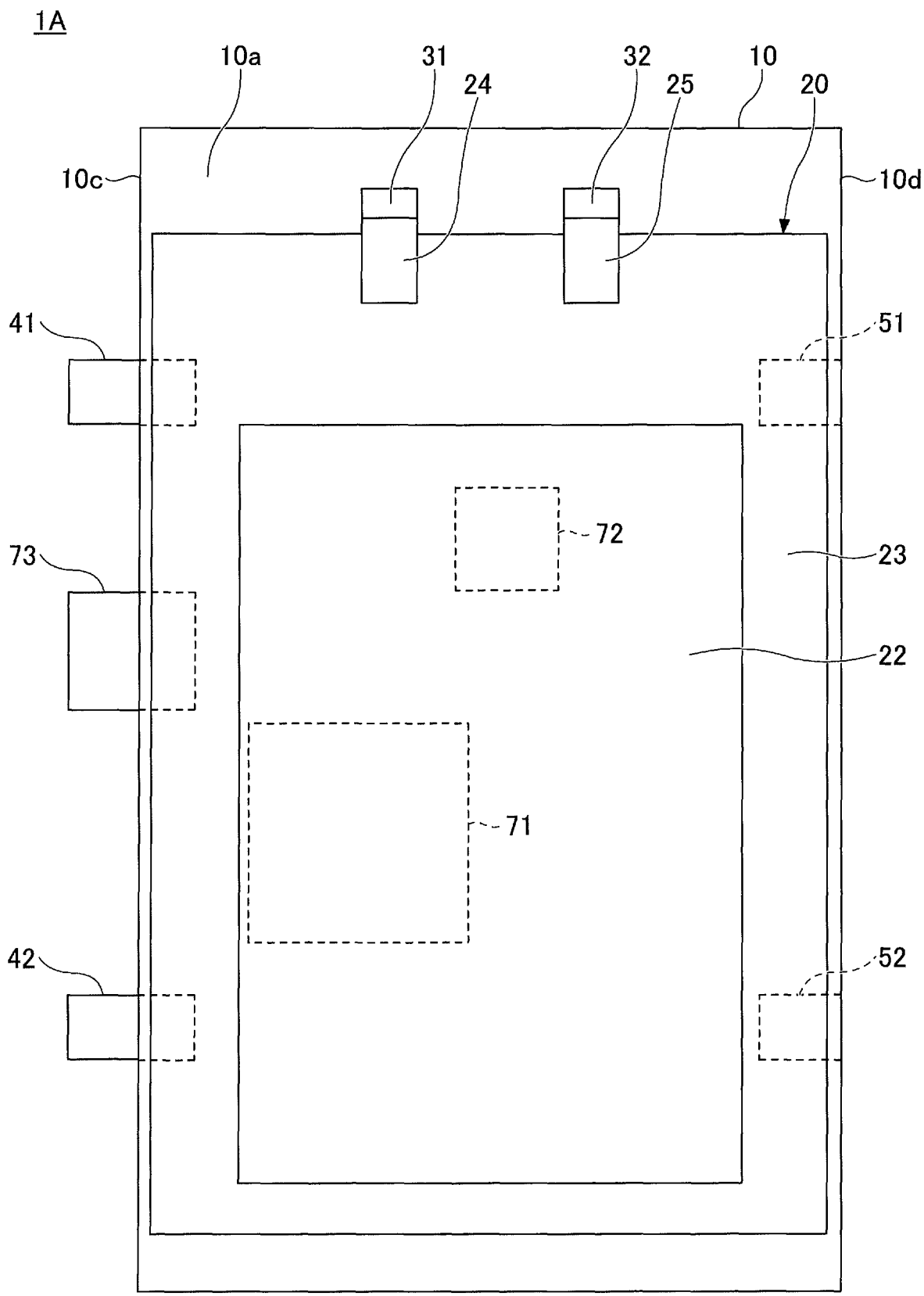
FIG. 8 is a plan view illustrating an example of a photoelectric conversion module according to a second embodiment.
Figure 9:
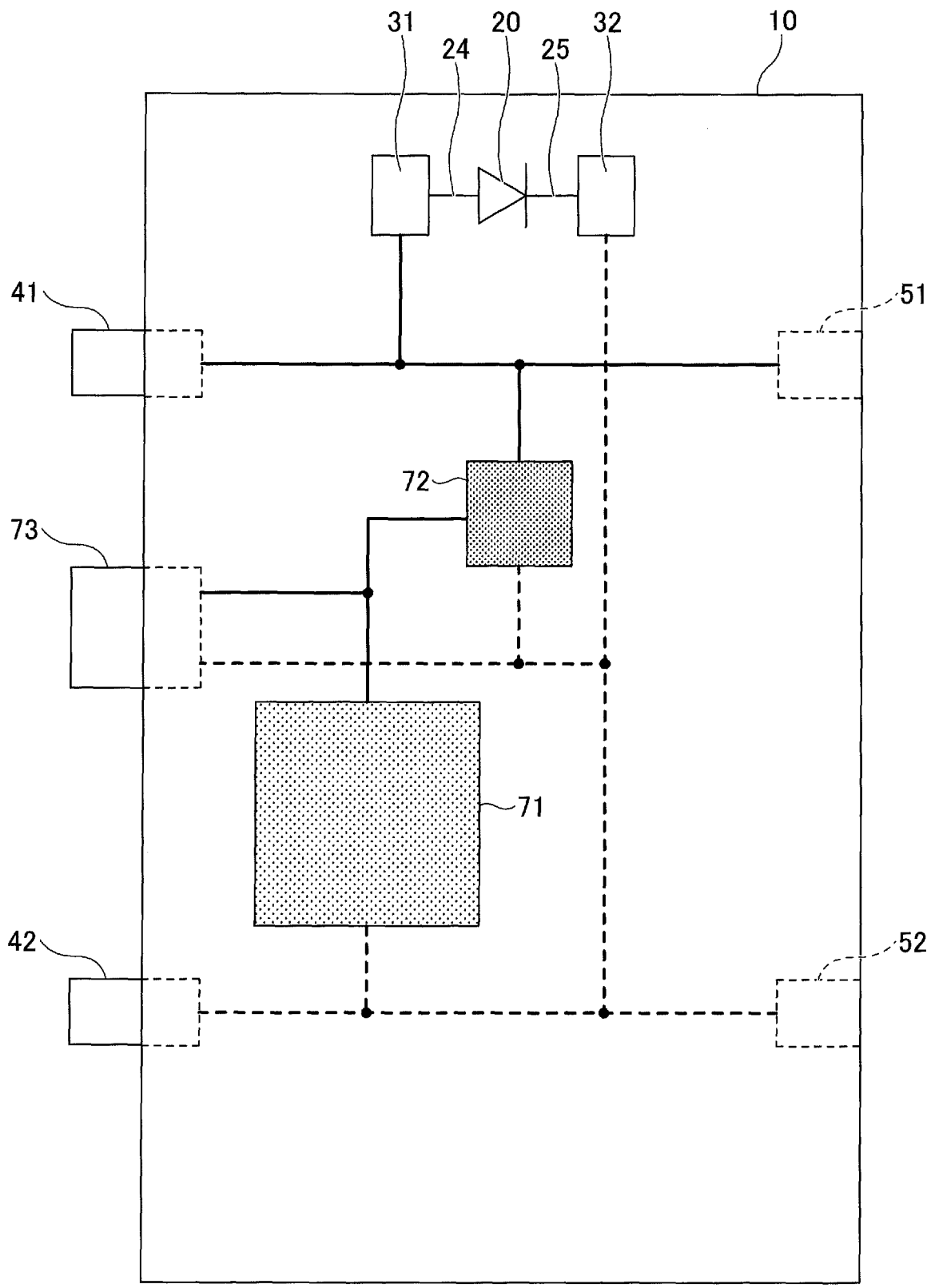
FIG. 9 is a schematic diagram illustrating an example of interconnects on a substrate of the photoelectric conversion module according to the second embodiment.

FIG. 8 is a plan view illustrating an example of the photoelectric conversion module according to the second embodiment. FIG. 9 is a schematic diagram illustrating an example of interconnects on a substrate of the photoelectric conversion module according to the second embodiment.

With reference to FIGS. 8 and 9, the photoelectric conversion module 1A is different from the photoelectric conversion module 1 (see FIG. 1 and other figures) in that the semiconductor integrated circuit 72, the power storage element 71, and a male connector 73 are further mounted on the substrate 10. The semiconductor integrated circuit 72, the power storage element 71, and the male connector 73 are, for example, mounted on the lower surface 10b of the substrate 10.

The semiconductor integrated circuit 72 is, for example, a power management IC for energy harvesting to which power to the photoelectric conversion element 20 is supplied. The power storage element 71 is, for example, an electric double layer capacitor and stores power generated by the photoelectric conversion element 20. Specifically, the output of the semiconductor integrated circuit 72 is coupled to the power storage element 71 and the power storage element 71 is charged.

The output of the semiconductor integrated circuit 72 (i.e., the output of the power storage element 71) is output to the outside from the male connector 73. The male connector 73 may be grouped into one connector common to the male connector 41 and/or the male connector 42, and the output of the semiconductor integrated circuit 72 may be assigned to any pin of the connector.

Figure 10:
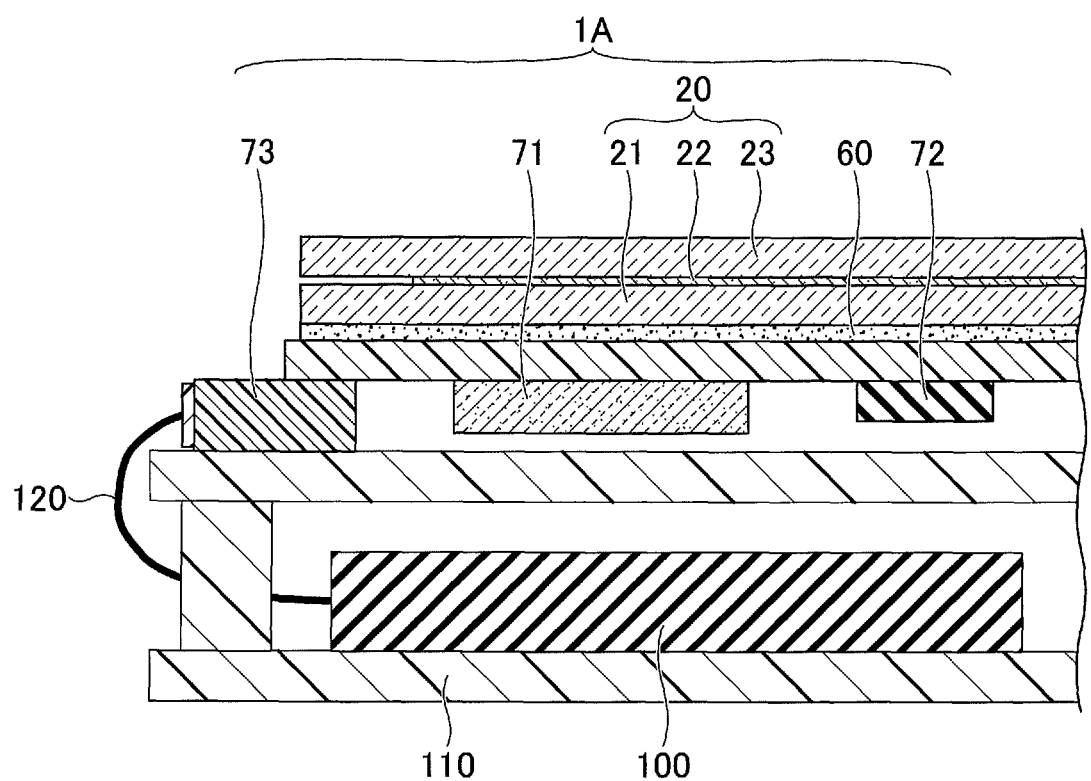
FIG. 10 is a cross-sectional view illustrating an example of a connection between a battery and the photoelectric conversion module according to the second embodiment.

The photoelectric conversion module 1A can charge a battery. FIG. 10 is a cross-sectional view illustrating an example of a connection between the battery and the photoelectric conversion module according to the second embodiment. With reference to FIG. 10, the photoelectric conversion module 1A is disposed on a substrate 110 including a battery 100. The male connector 73 of the photoelectric conversion module 1A is electrically coupled to a power connector 120 of the battery 100 to enable the battery 100 to be charged.

Figure 11:
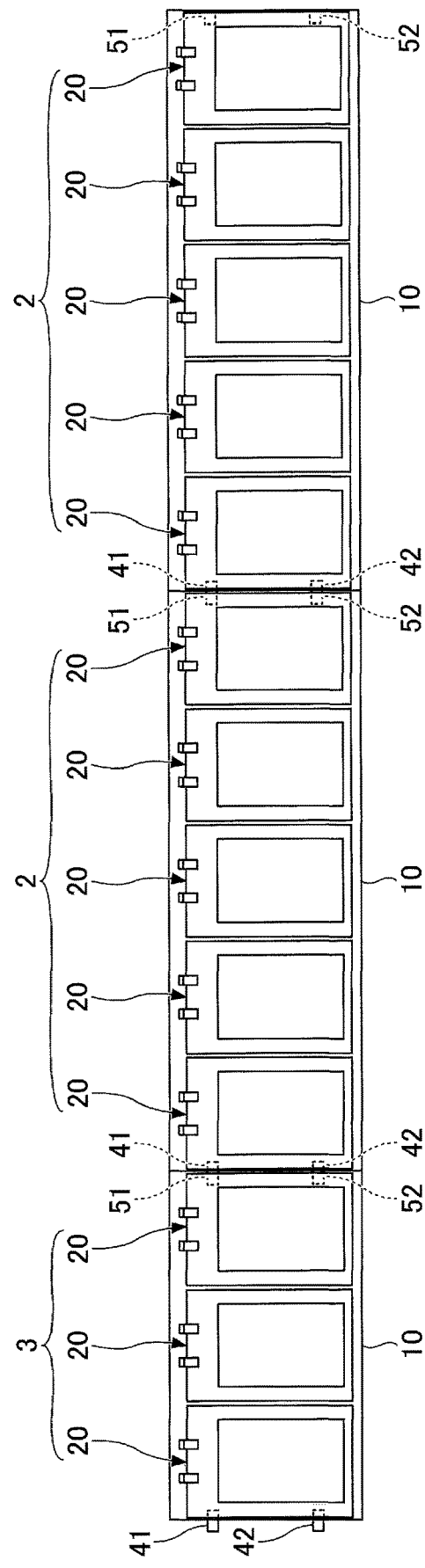
FIG. 11 is a second plan view illustrating an example of connections of multiple photoelectric conversion modules.

FIG. 11 is a second plan view illustrating an example of connections of multiple photoelectric conversion modules. As illustrated in FIG. 11, in a photoelectric conversion module array 6, two photoelectric conversion modules 2 each including five photoelectric conversion elements 20 mounted on one substrate 10 and one photoelectric conversion module 3 including three photoelectric conversion elements 20 mounted on one substrate 10 are coupled with each other through connectors. That is, the photoelectric conversion module array 6 includes 13 photoelectric conversion elements 20 in total. The photoelectric conversion module 3 is disposed at an end of the photoelectric conversion module array 6.

As illustrated in FIG. 11, when multiple photoelectric conversion elements 20 are mounted on one substrate 10, the connection between the photoelectric conversion elements 20 on the substrate 10 can be determined as desired. That is, in the photoelectric conversion modules 2 and 3, the photoelectric conversion elements 20 may be coupled in parallel, in series, or in another complicated connection.

It should be noted that the connection of FIG. 11 is an example, and, as long as the photoelectric conversion module array 6 includes the photoelectric conversion module 2 including n photoelectric conversion elements 20 (where n is a natural number equal to or greater than 2) mounted on one substrate 10, and the photoelectric conversion module 3 including m photoelectric conversion elements 20 (where m is a natural number smaller than n) mounted on one substrate 10, n and m may be arbitrary. In the photoelectric conversion module array 6, the number of the photoelectric conversion modules 2 and the number of the photoelectric conversion modules 3 can be determined as desired.

As in the photoelectric conversion module array 6, when multiple photoelectric conversion modules are coupled with each other, the photoelectric conversion elements 20 separately mounted are electrically coupled. In the photoelectric conversion module array 6, the light receiving area of the photoelectric conversion element 20 can be increased.

As described below, it is preferable that in the photoelectric conversion module array 6, the power storage element 71 for storing power generated by the photoelectric conversion elements 20 of the photoelectric conversion modules 2 and 3, is mounted on the substrate 10 of the photoelectric conversion module 3, and a power storage function similar to the power storage function of the photoelectric conversion module 1A is provided.

That is, since a location where the photoelectric conversion module array 6 is disposed has a predetermined length, the longitudinal length of the photoelectric conversion module array 6 needs to be adjusted to the predetermined length of the location where the photoelectric conversion module array 6 is disposed. The power storage function is concentrated on the photoelectric conversion module 3, so that the photoelectric conversion modules 2 can be made common. Therefore, by adjusting the number of the photoelectric conversion modules 2, the longitudinal length of the photoelectric conversion module array 6 can be easily adjusted to the predetermined length. This can achieve a flexible response to a customer specification.

Additionally, the photoelectric conversion module 3 including the power storage element 71 is disposed at the end of the photoelectric conversion module array 6, so that it is easy to be coupled to the outside when voltage stored by the power storage element 71 is output to the outside.

Furthermore, it is preferable that the photoelectric conversion module 3 including the power storage element 71 is disposed at the end of the photoelectric conversion module array 6, in that the voltage drop can be reduced when the power storage element 71 outputs the stored voltage to the outside.

However, depending on the predetermined length of the location where the photoelectric conversion module array 6 is disposed, the number of the photoelectric conversion elements 20 mounted in the photoelectric conversion module 3 may be the same as the number of the photoelectric conversion elements 20 mounted in the photoelectric conversion module 2, and the photoelectric conversion module 3 may include a power storage function. Alternatively, a configuration in which the power storage element 71 that stores power generated by the photoelectric conversion elements 20 of the photoelectric conversion module 2 and the photoelectric conversion module 3, is mounted on the substrate 10 of the photoelectric conversion module 2, and is disposed at the end of the photoelectric conversion module array 6, may be used.

Third Embodiment

In a third embodiment, an example of a photoelectric conversion module including an information storage function will be described. In the third embodiment, a description of the same component as the component of the embodiment previously described may be omitted.

Figure 12:
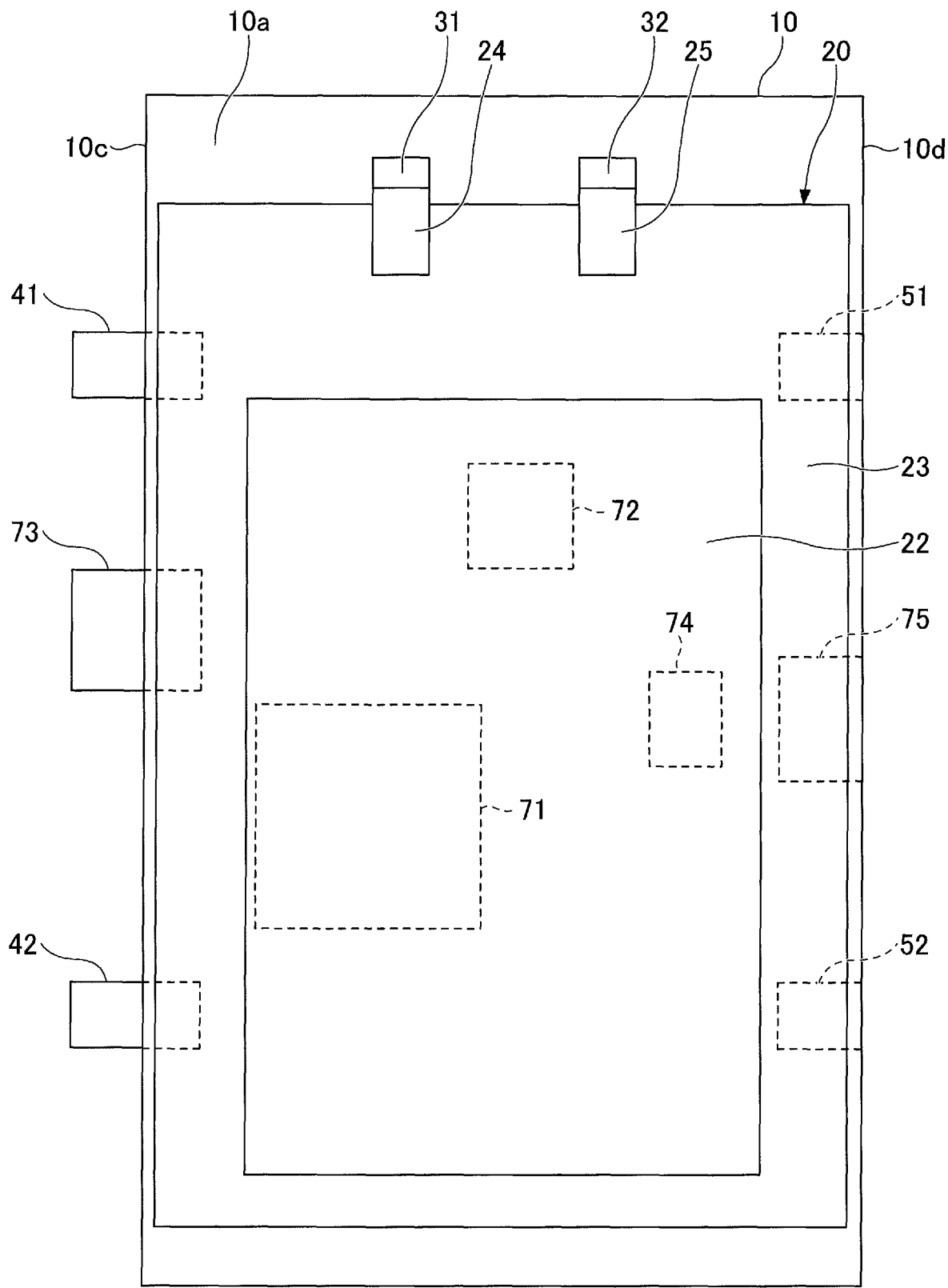
FIG. 12 is a plan view illustrating an example of a photoelectric conversion module according to a third embodiment.
Figure 13:
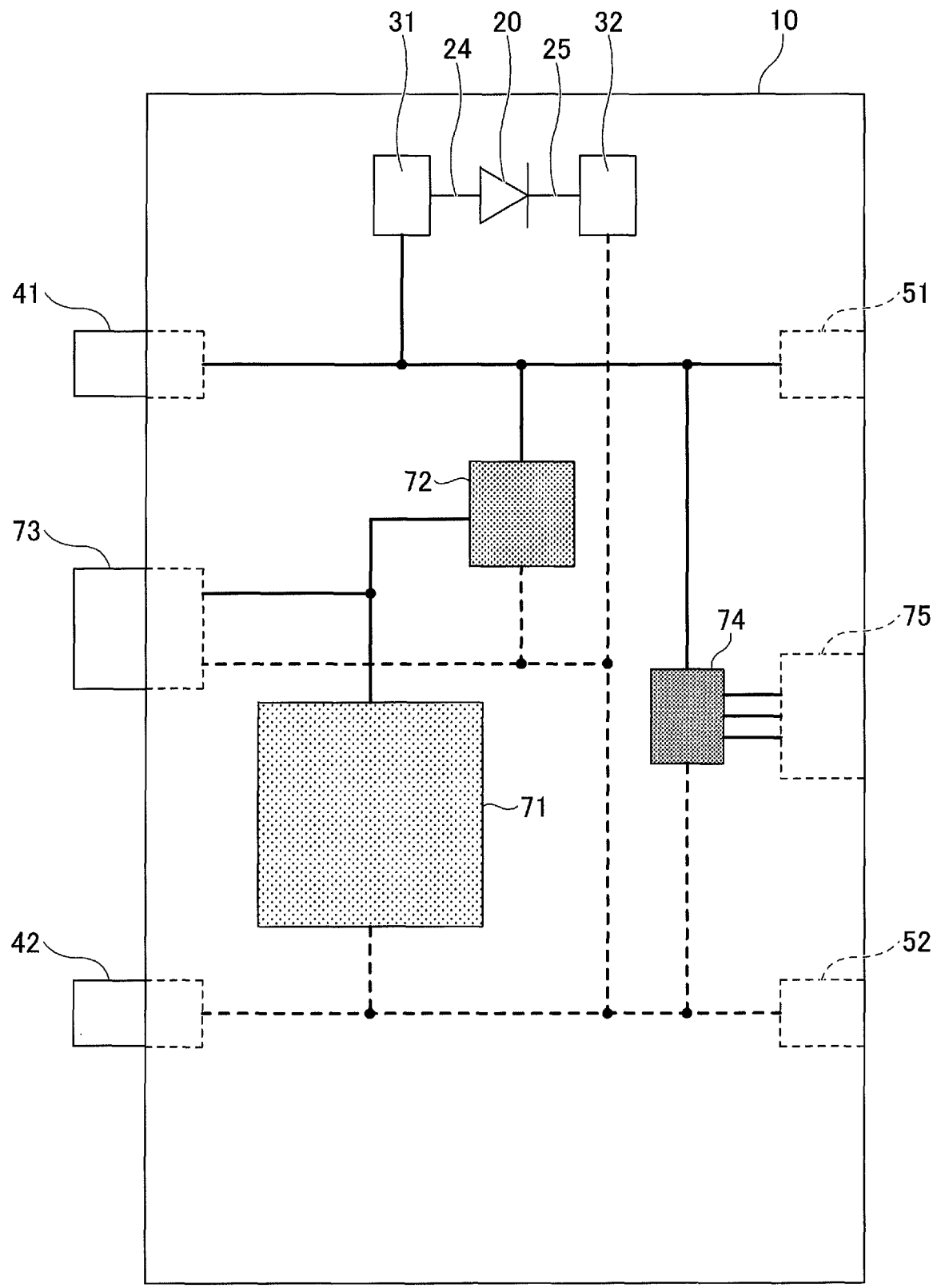
FIG. 13 is a schematic diagram illustrating an example of interconnects on a substrate of the photoelectric conversion module according to the third embodiment.

FIG. 12 is a plan view illustrating an example of the photoelectric conversion module according to the third embodiment. FIG. 13 is a schematic diagram illustrating an example of interconnects on a substrate of the photoelectric conversion module according to the third embodiment.

With reference to FIGS. 12 and 13, a photoelectric conversion module 1B is different from the photoelectric conversion module 1A (see FIG. 8 and other figures) in that a semiconductor integrated circuit 74 and a female connector 75 are added. The semiconductor integrated circuit 74 and the female connector 75 are, for example, mounted on the lower surface 10b of the substrate 10.

The semiconductor integrated circuit 74 is, for example, a serial electrically erasable programmable read only memory (a serial EEPROM) that stores predetermined information. The input and output of the semiconductor integrated circuit 74 can be coupled to a side of a circuit of the photoelectric conversion module 1B that is operated by the power supply (i.e., a circuit including a microcomputer) through the female connector 75. The female connector 75 may be grouped into a connector common to the female connector 51 and/or the female connector 52, and the input and output of the semiconductor integrated circuit 74 may be assigned to any pin of the connector.

The semiconductor integrated circuit 74 can be coupled to, for example, a microcomputer outside of the substrate 10 of the photoelectric conversion module 1B by $I^2C$ through the female connector 75. The information stored in the semiconductor integrated circuit 74 can be read from, for example, the microcomputer outside of the substrate 10. The semiconductor integrated circuit 74 can also be written from, for example, the microcomputer outside of the substrate 10.

The photoelectric conversion module 1B can be mounted in the photoelectric conversion module array 6 illustrated in FIG. 11 with coupling multiple photoelectric conversion modules 1B instead of the photoelectric conversion module 3. However, instead of coupling multiple photoelectric conversion modules 1B, components corresponding to multiple photoelectric conversion modules 1B may be mounted on one substrate.

The semiconductor integrated circuit 74 can store substrate information including, for example, information indicating a type of a component mounted on the substrate 10 of the photoelectric conversion module array 6. The information indicating the type of the component is, for example, whether the power storage element is mounted. Additionally, the semiconductor integrated circuit 74 may store connection information including information indicating the number of photoelectric conversion elements 20 mounted on the substrate 10. The semiconductor integrated circuit 74 may store any information including a lot number, a serial number, for example.

The substrate information and/or the connection information of the photoelectric conversion module array 6 is written to the semiconductor integrated circuit 74 from a microcomputer or the like in a manufacturing line of the photoelectric conversion module array 6, for example. The substrate information and/or the connection information written to the semiconductor integrated circuit 74 may be electrically rewritten as required.

Figure 14:
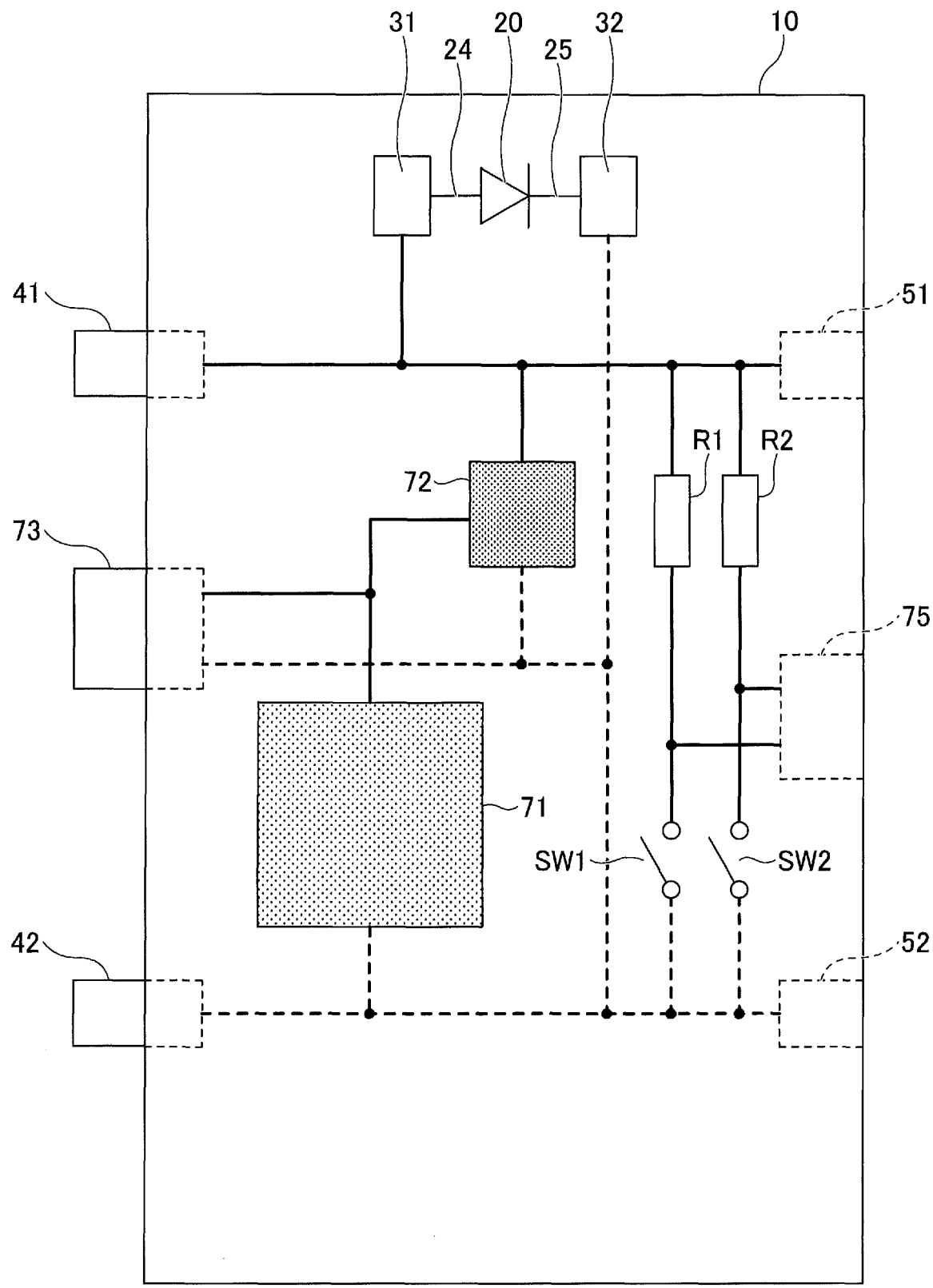
FIG. 14 is a schematic diagram illustrating an example of interconnects on a substrate of a photoelectric conversion module according to a modified example of the third embodiment.

FIG. 14 is a schematic diagram illustrating an example of interconnects on the substrate of the photoelectric conversion module according to a modified example of the third embodiment.

With reference to FIG. 14, a photoelectric conversion module 1C is different from the photoelectric conversion module 1B (see FIG. 13 and other figures) in that resistors R1 and R2, and switches SW1 and SW2 are added instead of the semiconductor integrated circuit 74. The switches SW1 and SW2 are, for example, DIP switches.

One terminal of the switch SW1 is coupled to the positive terminal 24 of the photoelectric conversion element 20 through the resistor R1, and is coupled to a predetermined terminal of the female connector 75. The other terminal of the switch SW1 is coupled to the negative terminal 25 of the photoelectric conversion element 20.

One terminal of the switch SW2 is coupled to the positive terminal 24 of the photoelectric conversion element 20 through the resistor R2, and is coupled to a predetermined terminal of the female connector 75. The other terminal of the switch SW2 is coupled to the negative terminal 25 of the photoelectric conversion element 20.

For example, when the switches SW1 and SW2 are both off, H and H are output from the female connector 75. When the switches SW1 and SW2 are both on, L and L are output from the female connector 75. By changing ON and OFF settings of the switches SW1 and SW2, four pieces of information can be output. By increasing the number of switches, more information can be output.

That is, in the photoelectric conversion module 1C, the substrate information and/or the connection information of the photoelectric conversion module array 6 can be stored by a combination of ON and OFF of the switches SW1 and SW2. A method of enabling the switch to change the setting of the substrate information and/or the connection information is preferred in that it is easy to change the setting compared with a method of storing the information in the semiconductor integrated circuit 74.

As described with reference to FIGS. 12 to 14, the substrate information and/or the connection information can be read from the circuit operated by the power supply of the photoelectric conversion module. This enables the circuit operated by the power supply of the photoelectric conversion module to determine what type of photoelectric conversion module is coupled.

For example, the substrate information and/or the connection information are read by a microcomputer or the like operated by the power supply of the photoelectric conversion module before an operation inspection process of the manufacturing line of the photoelectric conversion module, so that it is possible to determine whether the photoelectric conversion module is a module to be inspected. In this case, when it is determined that the photoelectric conversion module is a module to be inspected, the photoelectric conversion module is input in the operation inspection process. When it is determined that the photoelectric conversion module is not a module to be inspected, the photoelectric conversion module is rejected as a defective product.

Although the preferred embodiments have been described in detail above, the invention is not limited to the above-described embodiments. Various modifications and substitutions can be applied to the embodiments described above without departing from the scope of the invention as recited in the claims.

What is claimed is:

1. A photoelectric conversion module comprising:
   a substrate including a wiring pattern;
   a photoelectric conversion element mounted on the substrate, the photoelectric conversion element including an electrical terminal;
   a socket mounted on the substrate; the socket being connectable to the electrical terminal of the photoelectric conversion element, and
   a connector mounted on the substrate, the connector including a terminal that is electrically coupled to the photoelectric conversion element,
   wherein the connector is configured such that coupling the connector to a connector of another photoelectric conversion module causes the photoelectric conversion element to be electrically coupled to another photoelectric conversion element of the another photoelectric conversion module,
   wherein the electrical terminal of the photoelectric conversion element is electrically coupled to the wiring pattern of the substrate through the socket, and
   wherein the socket has an insertion hole, and the electrical terminal of the photoelectric conversion element is inserted thorough the insertion hole such that the photoelectric conversion element is removable from the substrate.

2. The photoelectric conversion module as claimed in claim 1,
   wherein the connector includes a male connector and a female connector,
   wherein a male connector of the photoelectric conversion module can be electrically and mechanically coupled to a female connector of another photoelectric conversion module that is disposed at one side of the photoelectric conversion module, and
   wherein a female connector of the photoelectric conversion module can be electrically and mechanically coupled to a male connector of another photoelectric conversion module that is disposed at another side of the photoelectric conversion module.

3. The photoelectric conversion module as claimed in claim 1, wherein a plurality of said photoelectric conversion elements are mounted on the substrate.

4. The photoelectric conversion module as claimed in claim 1, comprising a power storage element mounted on the substrate, the power storage element storing electric power generated by the photoelectric conversion element.

5. The photoelectric conversion module as claimed in claim 1, wherein substrate information including information indicating a type of a component mounted on the substrate, and/or connection information including information indicating the number of photoelectric conversion elements mounted on the substrate can be read outside of the substrate.

6. The photoelectric conversion module as claimed in claim 5, wherein at least one of the substrate information and the connection information is electrically rewritable.

7. The photoelectric conversion module as claimed in claim 5, wherein at least one of the substrate information and the connection information is configurable by a switch.

8. A photoelectric conversion module array in which a plurality of said photoelectric conversion modules as claimed in claim 1 are coupled with each other through said connectors, the photoelectric conversion module array comprising:
the plurality of photoelectric conversion modules including a plurality of first photoelectric conversion modules, and a second photoelectric conversion module,
wherein n photoelectric conversion elements (where n is a natural number equal to or greater than 2) are mounted on a substrate of a first photoelectric conversion module among the plurality of first photoelectric conversion modules, and
wherein m photoelectric conversion elements (where m is a natural number smaller than n) are mounted on a substrate of the second photoelectric conversion module.

9. The photoelectric conversion, module array as claimed in claim 8, comprising a power storage element mounted on the substrate of the second photoelectric conversion module, the power storage element storing electric power generated by the photoelectric conversion elements of the plurality of first photoelectric conversion modules and the second photoelectric conversion module.

10. The photoelectric conversion module array as claimed in claim 8, the photoelectric conversion module array including the plurality of first photoelectric conversion modules and one second photoelectric conversion module.

11. The photoelectric conversion module array as claimed in claim 10, wherein the second photoelectric conversion module is disposed on an end of the photoelectric conversion module array.

12. The photoelectric conversion module array as claimed in claim 8, comprising a power storage element mounted on the substrate of the first photoelectric conversion module, the power storage element storing electric power generated by the photoelectric conversion elements of the plurality of first photoelectric conversion modules and the second photoelectric conversion module, wherein the first photoelectric conversion module is disposed on an end of the photoelectric conversion module array.

13. The photoelectric conversion module as claimed in claim 1,
wherein the electrical terminal includes a positive electrical terminal and a negative electrical terminal,
wherein the socket includes a first socket and a second socket arranged parallel to a shorter side direction of the substrate in planar view, and
wherein the positive electrical terminal is inserted through an insertion hole of the first socket and the negative electrical terminal is inserted through an insertion hole of the second socket.

14. The photoelectric conversion module as claimed in claim 1,
wherein the electrical terminal includes a positive electrical terminal and a negative electrical terminal,
wherein the insertion hole includes a first insertion hole and a second insertion hole, and
wherein the positive electrical terminal is inserted through the first insertion hole and the negative electrical terminal is inserted through the second insertion hole.

\* \* \* \* \*